No. 693,774. Patented Feb. 18, 1902.
A. T. BEAUREGARD.
CALCULATOR.
(Application filed July 13, 1901.)

(No Model.) 2 Sheets—Sheet 1.

WITNESSES:
Edward Thorpe

INVENTOR
Armand T. Beauregard
BY
ATTORNEYS

No. 693,774. Patented Feb. 18, 1902.
A. T. BEAUREGARD.
CALCULATOR.
(Application filed July 13, 1901.)
(No Model.) 2 Sheets—Sheet 2.

WITNESSES:
Edward Thorpe

INVENTOR
Armand T. Beauregard
BY
ATTORNEYS

UNITED STATES PATENT OFFICE.

ARMAND T. BEAUREGARD, OF STAMFORD, CONNECTICUT.

CALCULATOR.

SPECIFICATION forming part of Letters Patent No. 693,774, dated February 18, 1902.

Application filed July 13, 1901. Serial No. 68,170. (No model.)

*To all whom it may concern:*

Be it known that I, ARMAND T. BEAUREGARD, a citizen of the United States, and a resident of Stamford, in the county of Fairfield and State of Connecticut, have invented a new and Improved Calculator, of which the following is a full, clear, and exact description.

The object of the invention is to provide a new and improved calculator more especially designed for use in testing the accuracy of electric recording-wattmeters and finding by mere inspection the percentage error whether the meter is fast or slow.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1:
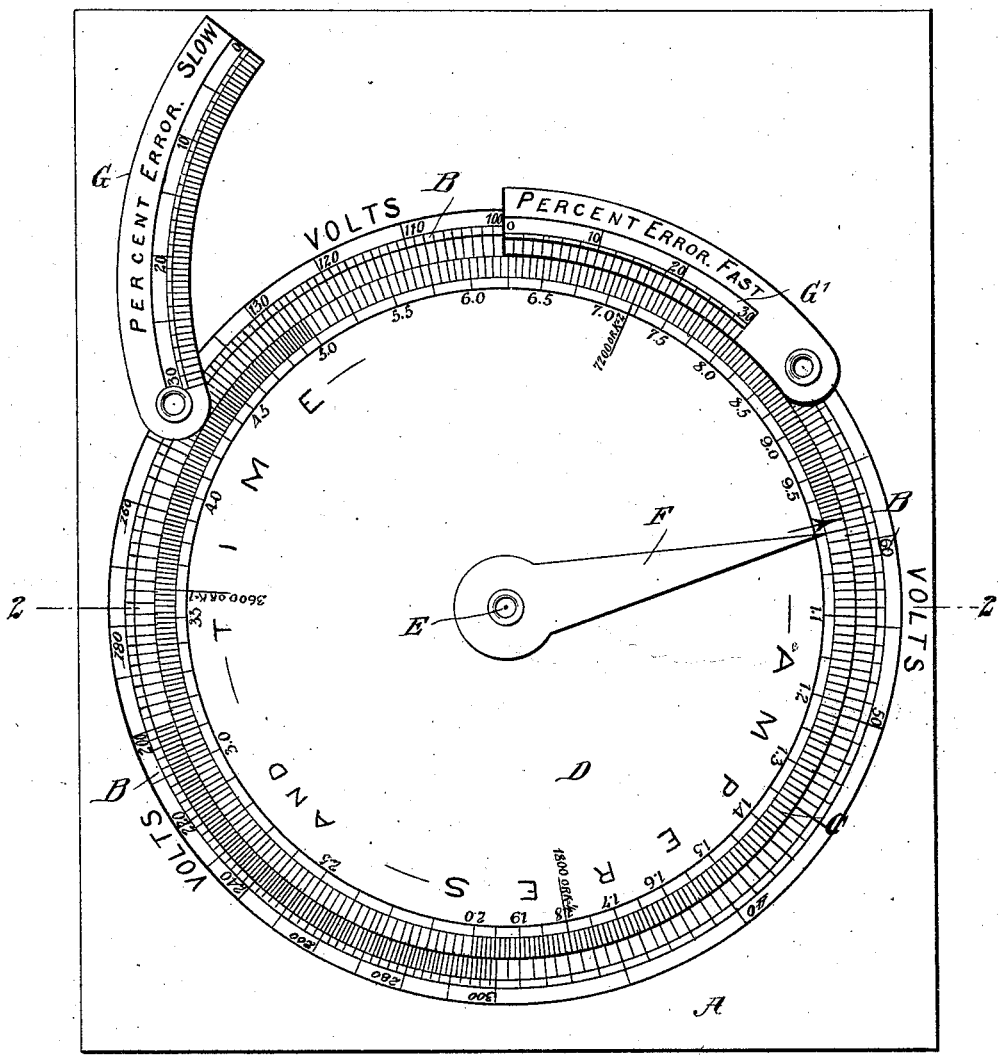
Figure 2:
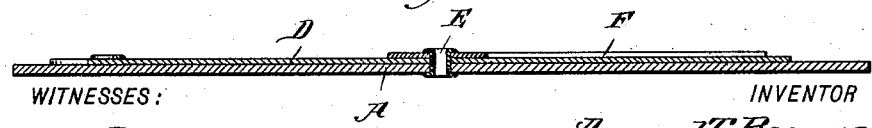
Figure 3:
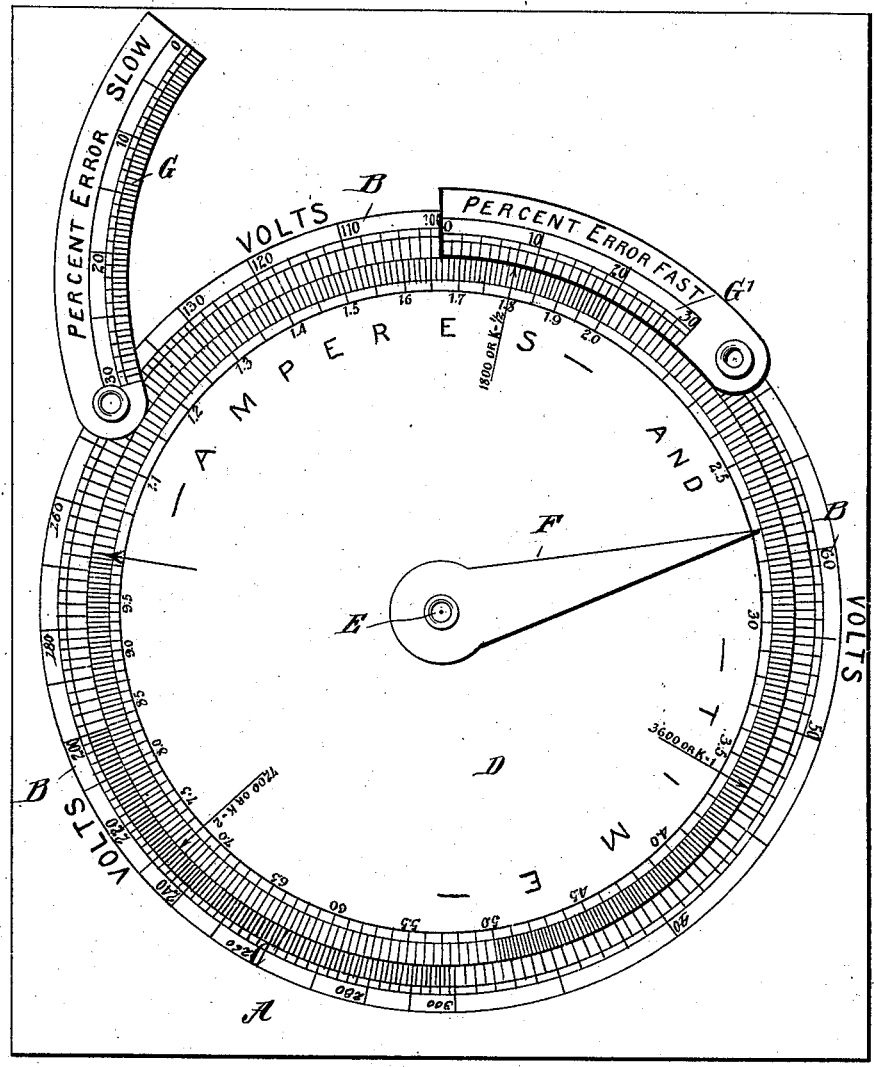

Figure 1 is a face view of the improvement. Fig. 2 is a sectional side elevation of the same on the line 2 2 in Fig. 1, and Fig. 3 is a face view of the improvement with parts in a different position.

The usual way of testing electric recording-wattmeters is to place an ammeter and a voltmeter in the circuit supplied by the meter, and then note the time required for one revolution of the meter-disk when a definite current is flowing through the meter at a definite voltage. Now if the current be C, (amperes,) the voltage V, (volts,) and the time T, (seconds,) then the watts will be $V \times C$ and the watt seconds $V C T$. As, however, the wattmeter records watt hours, not watt seconds, and as all calculations are on this basis, the watt seconds must be reduced to watt hours. Then the watt hours of energy that the meter has registered during the time T will be $\frac{V C T}{3600}$, there being thirty-six hundred seconds in one hour. When the disk of a wattmeter revolves once for the passage of one watt hour, then this formula will apply—that is, $\frac{V C T}{3600} = 1$, or $V C T = 3600$. In order to keep the speed of a disk within convenient limits, however, large or very small meters are so wound as to require more or less than a watt hour for one revolution of the disk. Then $V C T = 3600 K$, K being a constant depending on the amount of energy required to rotate the disk once. If this amount be one watt hour, K equals one. If it is two watt hours, K equals two, and if it is one-half watt hour K equals one-half, and so on. K is usually made an even whole number or a simple fraction, so that the value 3600 K is usually a simple multiple or submultiple of thirty-six hundred.

The usual way of calculating the percentage error of a wattmeter is to obtain $V C T$ as above and the constant K as given by the manufacturer and compare the watts as indicated by the meter with the true watts as indicated at the readings of the voltmeter, ammeter, or the like, (assuming a power factor of 1 or allowing for a different power factor,) subtracting the lesser of the two from the greater and expressing the difference as a percentage of true watts—that is to say, if W is the true watts and M the watts as indicated by the meter, then W equals $V C$ and M equals 3600 K. The percentage error of the meter will now be $\% \frac{W - M}{W} \times 100$. If W is greater than M, then the meter is slow. The percentage error when the meter is fast or when M exceeds W is $\% = \frac{M - W}{W} \times 100$.

It is desirable, though not absolutely necessary, to express errors thus—that is to say, in the percentage of true reading. In my invention, presently to be described in detail, the user is enabled to quickly, accurately, and conveniently obtain the result by mechanically actuating the parts of the calculator and then reading the indicated result.

On a suitably-constructed board or table A, of paper, pasteboard, celluloid, wood, metal, or other suitable material, is arranged a graduation B, indicating voltages likely to be met with in practice and laid off logarithmically in a closed circle, and another graduation C on a disk D concentric to the graduation B and mounted to turn on a pivot E, held on the board or table A, as indicated in the drawings. The graduation C indicates the amperes and time and is divided logarithmically into ten parts and subdivisions. On the pivot E is mounted to turn independently of the disk D a pointer F, for the purpose of indicating points on the graduations B and C. The percentage-scales G G' are arranged to overlie portions of the graduation B, and for this purpose said scales G G' are preferably hinged to the board or table A and are swung over the graduation B and away from the same to permit reading relatively to the graduation C, as hereinafter more fully described. The scales G G' indicate the percentage error fast or slow with the zero of the scales when in active position and standing at "100" on the volt-graduation B, it being understood that the graduations on the scales G G' really indicate logarithmic volts plus or minus one hundred—that is to say, the one-hundred-and-twenty-per-cent. point is called plus twenty per cent., and the eighty-seven-per-cent. point is called minus thirteen per cent.

To use the instrument proceed as follows: The current reading on the movable scale is placed opposite the volt reading on the fixed scale B, and the pointer F is placed over the zero reading on the graduation C. Then the time reading on the movable graduation C is placed under the pointer F, and the percentage error of the meter fast or slow is then indicated on the percentage-scale G or G' by the line on the movable graduation C which indicates the constant of the meter. The meter-constant lines may be conveniently represented on the movable scale by figures corresponding to the constant or multipliers as given by the manufacturers. Thus the meter-constant line for a meter whose multiplier as stated by the manufacturer is two is located at the logarithmic-scale line for thirty-six hundred multiplied by three or seventy-two. If the meter is correct, the meter-constant line indicates zero error. It is noted that the voltage-scale is laid off in a direction opposite to that of the ampere and time graduation C. In case the current C equals 5.6 V equals one hundred and ten, T equals 2.7, and the constant of the meter as given by the manufacturer is one-half, then the user proceeds as follows: The "5.6" point of the ampere graduation C is moved opposite the "110" point of the volt-scale B by turning the disk D correspondingly, and then the pointer F is moved to "1" or "10" on the graduation C. The operator then turns the disk D until the "2.7" point of the time or ampere graduation C is directly under the pointer F, (see Fig. 3,) and then the percentage error of the meter will lie on the percentage-scale G' at the point opposite the meter-constant line which lies at the thirty-six-hundred multiplied by one-half or the "18" point of the movable scale G'. The percentage error will be found to be eight fast, as shown in Fig. 3.

Having thus fully described my invention, I claim as new and desire to secure by Letters Patent—

A calculator, comprising a fixed circular voltage graduation logarithmically indicating the voltages, a rotatable disk concentric to the said voltage graduation and having an ampere and time graduation logarithmically indicating the amperes and time, a pointer movable on the disk independent of the latter, and a percentage-scale movably arranged to overlie the voltage graduation and indicating the logarithmic values plus or minus one hundred.

In testimony whereof I have signed my name to this specification in the presence of two subscribing witnesses.

ARMAND T. BEAUREGARD.

Witnesses:
W. F. SCOFIELD,
SAMUEL S. RAMBO.